Patented Nov. 27, 1923.                                          1,475,455

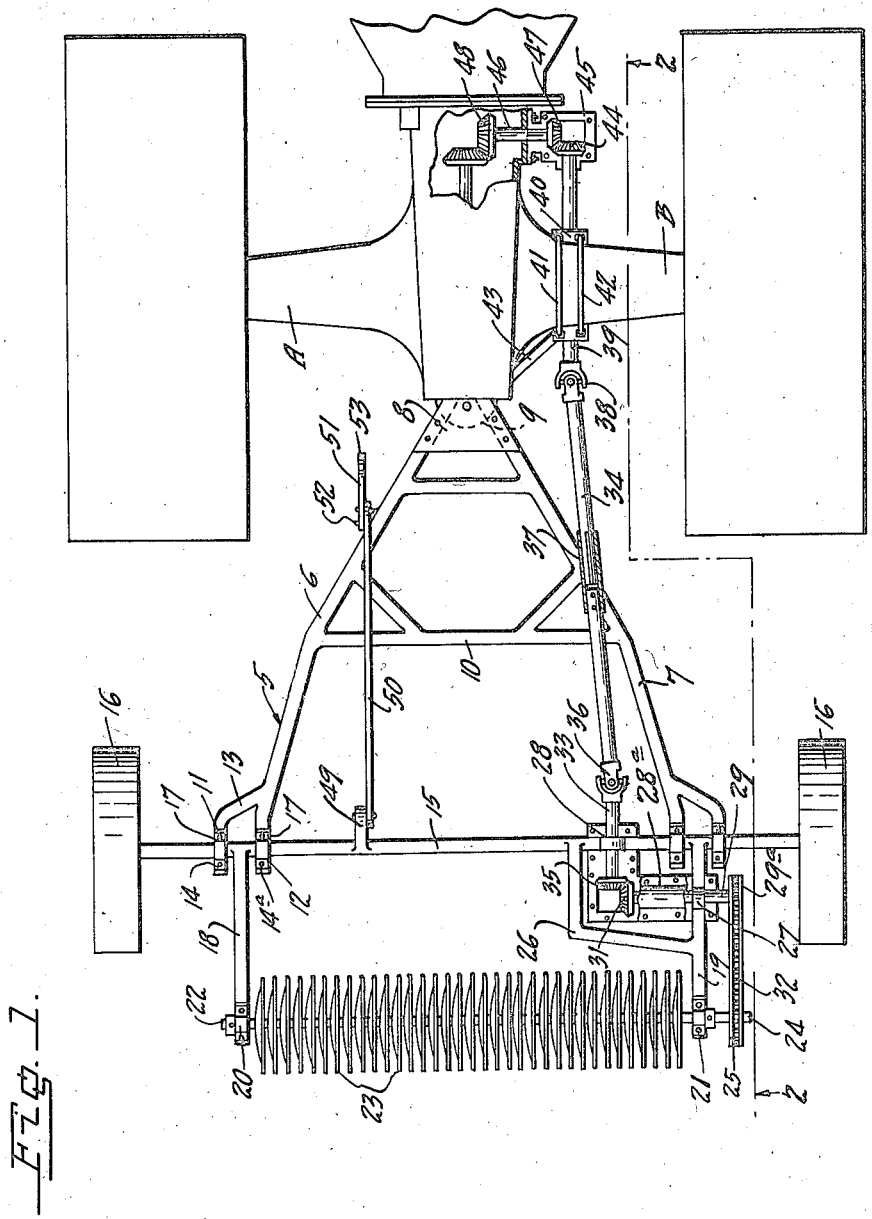

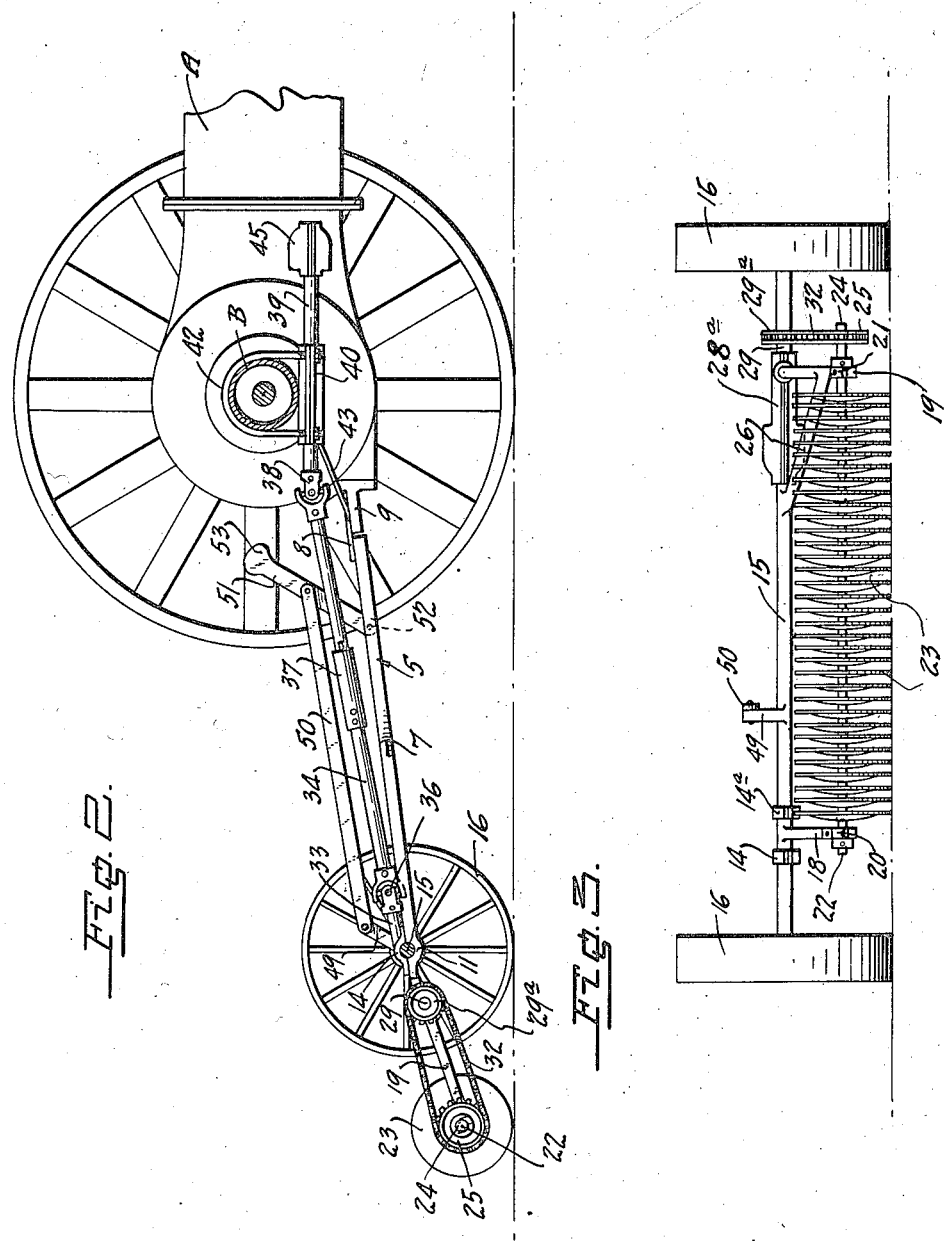

UNITED STATES PATENT OFFICE.

WILLIAM L. SKINNER AND JOHN J. KING, OF THOMASTON, ALABAMA.

AGRICULTURAL IMPLEMENT.

Application filed October 18, 1922.  Serial No. 595,292.

*To all whom it may concern:*

Be it known that we, WILLIAM L. SKINNER and JOHN J. KING, citizens of the United States, residing at Thomaston, in the county of Marengo and State of Alabama, have invented certain new and useful Improvements in Agricultural Implements, of which the following is a specification, reference being had to the accompanying drawings.

This invention relates to agricultural implements, and more particularly to an agricultural implement in the form of an attachment for tractors.

It is an object of the invention to provide a device of this character which can be readily connected to the tractor and controlled from the seat of the tractor.

It is another object of the invention to provide a device of this character wherein the tractor not only serves as the draft means of the device, but also as means for supporting a portion of the device.

It is a further object of the invention to provide a device of this character in the form of an attachment for tractors and wherein the ground treating implements of the attachment may be operated by the engine of the tractor to increase or decrease the movement thereof, regardless of the movement of the wheels of the device.

It is a still further object of the invention to provide an attachment of this character which is supported and operated by the tractor and which is capable of being adjusted relative to the ground.

With these and other objects in view, the invention consists in the improved construction and arrangement of parts to be hereinafter more particularly described, fully claimed and illustrated in the accompanying drawings, in which:—

Figure 1 is a top plan view of an agricultural implement constructed in accordance with an embodiment of the invention;

Figure 2 is a side elevation and sectional view taken on the line 2—2 of Figure 1;

Figure 3 is an end elevation of the implement detached.

Referring to the drawings, 5 designates a frame comprising side beams 6 and 7, the forward end portions of said beams converging with respect to each other and having their ends connected to a plate 8. This plate is provided with an opening for connection to the draw bar cap 9 of the tractor A. Disposed centrally of the frame and the beams 6 and 7 is a central brace beam 10 which holds the side beams 6 and 7 in spaced relation to each other.

The edge portions of the beams 6 and 7 diverge with respect to each other and have their extremities formed into bearing sections 11 and 12. Extending from the rear end portions of each of the beams 6 and 7 is an arm 13, said arm extending rearwardly and having its extremity formed into bearings 14 and $14^a$ which are disposed substantially in alignment with the sections of the bearings 11 and 12, but in spaced relation to said bearings.

Disposed within the sectional bearings 11, 12, 14 and $14^a$ is a shaft 15 which forms the main shaft of the device. The ends of the shaft are provided with ground engaging wheels 16. Bearing plates 17 are disposed over the sections of the bearings 11, 12, 14 and $14^a$ and are secured thereto to prevent disengagement of the main shaft from the frame. Extending from that portion of the shaft disposed between the bearings 11 and 12 and the bearings 14 and $14^a$ of the frame are arms 18 and 19, said arms being rigid and movable with the shaft. The outer ends of the arms 18 and 19 are provided with bearings 20 and 21 in which an implement shaft 22 is mounted. Mounted on the shaft 22 is a plurality of disc harrowing implements 23 which are rotatable with the shaft. The end portion 24 of the shaft 22 projects beyond the shaft 19 and is provided with a sprocket wheel 25, the purpose of which will be hereinafter described.

The arm 19 is properly braced by a bracing member 26 which extends from the central portion of the arm 19 to the shaft 15. The arm 19 is provided with a bearing 27, while the shaft 15 is provided with a similar bearing 28. A substantially L-shaped housing $28^a$ is connected to the arm 19 and shaft 15 adjacent the bearings 27 and 28. A shaft 29 is mounted in the bearing 27, and housing $28^a$. The outer end of the shaft 29 is provided with a sprocket wheel $29^a$, while the opposite end of the shaft is provided with a bevel gear 31.

A sprocket chain 32 is supported by the sprocket wheels 25 and $29^a$ for the purpose of rotating the shaft 22 and the ground treating implements 23. The shaft 29 is disposed parallel to the shaft 15 and is movable with the arms 19 when the device is being adjusted.

Journaled in the bearing 28 and also the housing 28ª is the section 33 of a sectional drive shaft 34, the inner end of the section 33 being provided with a bevel gear 35 adapted to mesh with the bevel gear 31 on the shaft 29. The section 33 of the drive shaft is connected to the shaft 34 by means of a universal joint 36, while connected to the opposite end of the shaft 34 is a combination rotatable and slidable joint 37. A second universal joint 38 is carried by the rotatable and slidable joint 37, one portion of the universal joint 38 being carried by an operating shaft 39.

The shaft 39 is journaled in a bearing 40 which is connected to the rear axle housing B of the tractor A by means of clamps 41 and 42, the clamps being prevented from movement longitudinally of the shaft by means of a brace 43 which is connected to one end of the clamp 41 and to the draw bar cap 9. The forward end portion of the shaft 39 is provided with a bevel gear 44, said gear being disposed in a housing 45, carried by the body portion of the tractor and over the opening of the body member disposed adjacent the transmission mechanism of the tractor. Journaled in the housing is a shaft 46 having a bevel gear 47 on one end adapted to engage the bevel gear 44, and a bevel gear 48 on its opposite end adapted to engage the transmission drive shaft bevel gear of the transmission mechanism.

Formed integral with and extending from the shaft 15 is an arm 49 to which a link 50 is connected. The forward end of said link is connected to the central portion of a lever 51 pivoted at its end 52 to the forward portion of the beam 6, the lever being provided with a handle 53. Through the medium of the lever, the link 50, and the arm 49, the ground treating implements may be raised or lowered by oscillating the shaft 15.

In use, the plate 8 is coupled to the draw bar cap 9 of the tractor and the shaft 39 coupled by the universal joint 38 to the shaft 34 through the medium of the slidable and universal joint. When the engine of the tractor is in motion rotary movement will be imparted to the shaft 22 to rotate said shaft at the speed desired so that the harrowing implements may travel at a greater speed than that of the cultivating implement in view of the gearing. If it is desired to permit the disc 23 to penetrate the ground a considerable depth the lever 16 may be operated so as to swing the arms 18 and 19 downwardly and with them the shaft 22. When the harrowing implement is not desired the shaft may be raised after shutting off the engine of the tractor so that the cultivator may be conveyed from place to place without disconnecting the shaft and gear mechanism from the engine of the tractor.

From the foregoing it will be readily seen that this invention provides a novel form of agricultural implement which is capable of being connected to a tractor and wherein the rear wheels of the tractor serve as the front or supporting wheels of the cultivating implement, and also wherein the power means of the tractor is utilized to actuate the ground treating means of the implement. By the novel means used to connect the shafts 34 and 39 to each other the relative movement of the implement and the tractor will not interfere with the rotation of the shaft 22 as the sections of the slidable and universal joint 37 are capable of moving relative to each other so as to adjust themselves to the distance between the frame of the implement and the rear axle housing of the tractor. Furthermore, the up and down movement of the tractor is compensated for by the universal and slidable joints. All of these features are possessed by a device which is compact in form.

What is claimed is:—

An implement attachment for tractors comprising a frame having its forward end equipped with means for connection with the draw bar of a tractor, a rock shaft journaled transversely of the frame and carrying ground engaging wheels rotatable thereon, rearwardly extending arms secured upon the shaft, an implement carrying shaft journally supported by said arms, a counter-shaft journaled in said frame in spaced parallel relation to said shafts, an operative connection between the counter-shaft and the implement carrying shaft for driving the same, a forwardly extending shaft journaled in the frame and operatively connected with said counter-shaft, a power take-off device driven from and engaging a rotary element of the tractor transmission and including a rearwardly extending shaft supported from the rear axle housing of the tractor, and a telescopic connecting shaft connected with said forwardly extending shaft and said last named shaft by universal joint connections, and a lever mechanism on the frame connected with an arm on said first named shaft whereby to raise and lower the implement, the universal joints and the telescopic adjustability of the last named shaft permitting said raising.

In testimony whereof we hereunto affix our signatures.

WILLIAM L. SKINNER.
JOHN J. KING.